United States Patent
Podgorny et al.

(10) Patent No.: US 11,341,955 B2
(45) Date of Patent: May 24, 2022

(54) INTEGRATING AUTOMATIC SPEECH RECOGNITION AND COMMUNITY QUESTION ANSWERING

(71) Applicant: Intuit Inc., Mountain View, CA (US)

(72) Inventors: Igor A. Podgorny, San Diego, CA (US); Michael R. Cowgill, Encinitas, CA (US); Faraz Sharafi, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 118 days.

(21) Appl. No.: 16/850,095

(22) Filed: Apr. 16, 2020

(65) Prior Publication Data

US 2021/0327412 A1 Oct. 21, 2021

(51) Int. Cl.
*G10L 15/06* (2013.01)
*G06Q 50/26* (2012.01)
*G06N 20/00* (2019.01)
*G06Q 30/00* (2012.01)
*G10L 15/26* (2006.01)

(52) U.S. Cl.
CPC ............ *G10L 15/063* (2013.01); *G06N 20/00* (2019.01); *G06Q 30/016* (2013.01); *G06Q 50/26* (2013.01); *G10L 15/26* (2013.01); *G10L 2015/0635* (2013.01)

(58) Field of Classification Search
None
See application file for complete search history.

(56) References Cited

U.S. PATENT DOCUMENTS

| | | | |
|---|---|---|---|
| 7,813,926 B2 * | 10/2010 | Wang | G10L 15/063 704/245 |
| 9,697,835 B1 * | 7/2017 | Kuo | G10L 15/063 |
| 10,573,312 B1 * | 2/2020 | Thomson | G10L 15/26 |
| 2011/0213613 A1 * | 9/2011 | Cohen | G10L 15/187 704/235 |
| 2017/0206890 A1 * | 7/2017 | Tapuhi | G06N 3/006 |
| 2018/0330737 A1 * | 11/2018 | Pau | G10L 15/30 |
| 2021/0182661 A1 * | 6/2021 | Li | H04L 41/082 |
| 2021/0248996 A1 * | 8/2021 | Itoh | G10L 15/183 |
| 2021/0375288 A1 * | 12/2021 | Thomson | G10L 15/30 |

* cited by examiner

*Primary Examiner* — Nafiz E Hoque
(74) *Attorney, Agent, or Firm* — Paradice and Li LLP (57) ABSTRACT

Systems and methods for providing customized automatic speech recognition (ASR) in a customer support system are disclosed. In an example method, one or more data sources for training an ASR language model associated with the customer support system are identified, and one or more weighting models are selected, each weighting model applying a corresponding weight to each data source of the one or more data sources. The ASR language model is then trained based at least in part on the one or more data sources and the one or more weighting models, and a transcript may be generated for one or more customer support calls of the customer support system using the trained ASR language model.

16 Claims, 5 Drawing Sheets

INTEGRATING AUTOMATIC SPEECH RECOGNITION AND COMMUNITY QUESTION ANSWERING

TECHNICAL FIELD

This disclosure relates generally to automatic speech recognition, and more specifically to training automatic speech recognition systems.

DESCRIPTION OF RELATED ART

Speech recognition systems are increasingly used for generating real-time, or near real-time transcripts. Such transcripts may be used for natural language processing systems, artificial intelligence, machine learning, and so on. One application for such transcripts is in the area of summarizing transcripts of assisted support sessions. Assisted support sessions are increasingly employed during calls or conversations between customers of a company and agents or professionals of the company. As part of the assisted support sessions, speech recognitions systems may be used to generate transcripts of the calls or conversations, for example, for record keeping, customer feedback, agent feedback, and for improving customer service. Although speech recognitions systems can transcribe ordinary day-to-day conversations with an acceptable amount of error, such systems are much less effective when transcribing conversations involving certain subject matter for which there are specific terms, phrases, acronyms, and/or other verbiage not typically used in ordinary day-to-day conversations. For example, automatic speech recognition (ASR) systems may not be able to transcribe conversations related to topics such as tax preparation and financial planning with an acceptable degree of accuracy due to the highly specialized terms of art, phrases, and other lexicon associated with such services. As a result, ASR systems tasked with transcribing such conversations often require human intervention to correct transcription errors, which reduces the efficiency and cost-effectiveness of such ASR systems.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method for providing customized automatic speech recognition (ASR) in a customer support system. The method can be performed by one or more processors of the customer support system and can include identifying a data source internal to the customer support system that pertains to a subject matter of the call or conversation; identifying a data source external to the customer support system that pertains to the subject matter of the call or conversation; selecting one or more weighting models based on at least one characteristic of the customer; weighting one or more of the internal data source and the external data source based on the one or more selected weighting models; training the ASR language model using the one or more weighted data sources; and generating a transcript of the call or conversation using the trained ASR language model. The at least one characteristic of the customer can include a level of sophistication of the customer. In some implementations, the one or more weighting models are configured to apply higher weights to the external data source than to the internal data source when the level of sophistication of the customer is relatively high, and the one or more weighting models are configured to apply higher weights to the internal data source than to the external data source when the level of sophistication of the customer is relatively low.

The customer support system can be a tax-related customer support system, and the external data source can be a governmental tax agency. In some instances, the internal data source can be user generated content (UGC) including comprising questions or answers submitted by users of the customer support system. In other instances, the internal data source can be conversational user interface (CUI) fallback statements from users of the customer support system.

In some implementations, the method also includes estimating the level of sophistication of the customer based on one or more statements made by the customer during the call or conversation, switching from a first weighting model of the one or more weighting models to a second weighting model of the one or more weighting models based at least in part on the estimated level of sophistication, and updating the ASR language model based on the switching. Additionally, the method can include identifying retraining data associated with the subject matter of the call or conversation and retraining the ASR model using the identified retraining data. In some implementations, identifying the retraining data includes applying a probabilistic topic analysis to one or more transcripts generated for calls or conversations with the customer, and identifying at least one transcript of the one or more transcripts that has an elevated word error rate (WER). In other implementations, identifying the retraining data includes identifying one or more long-tail search queries submitted by customers of the customer support system. In some other implementations, identifying the retraining data includes identifying one or more conversational user interface (CUI) fallback statements submitted by customers of the customer support system.

Another innovative aspect of the subject matter described in this disclosure can be implemented as a system for providing customized automatic speech recognition (ASR) in a customer support system. The system can include one or more processors coupled to a memory. The memory can store instructions that, when executed by the one or more processors, cause the system to perform a number of operations. In some implementations, the number of operations includes identifying a data source internal to the customer support system that pertains to a subject matter of the call or conversation; identifying a data source external to the customer support system that pertains to the subject matter of the call or conversation; selecting one or more weighting models based on at least one characteristic of the customer; weighting one or more of the internal data source and the external data source based on the one or more selected weighting models; training the ASR language model using the one or more weighted data sources; and generating a transcript of the call or conversation using the trained ASR language model. The at least one characteristic of the customer includes a level of sophistication of the customer. In some implementations, the one or more weighting models are configured to apply higher weights to the external data source than to the internal data source when the level of sophistication of the customer is relatively high, and the one or more weighting models are configured to apply higher weights to the internal data source than to the external data source when the level of sophistication of the customer is relatively low.

The customer support system can be a tax-related customer support system, and the external data source can be a governmental tax agency. In some instances, the internal data source can be user generated content (UGC) including comprising questions or answers submitted by users of the customer support system. In other instances, the internal data source can be conversational user interface (CUI) fallback statements from users of the customer support system.

In some implementations, the number of operations also includes estimating the level of sophistication of the customer based on one or more statements made by the customer during the call or conversation, switching from a first weighting model of the one or more weighting models to a second weighting model of the one or more weighting models based at least in part on the estimated level of sophistication, and updating the ASR language model based on the switching. Additionally, the number of operations can include identifying retraining data associated with the subject matter of the call or conversation and retraining the ASR model using the identified retraining data. In some implementations, identifying the retraining data includes applying a probabilistic topic analysis to one or more transcripts generated for calls or conversations with the customer, and identifying at least one transcript of the one or more transcripts that has an elevated word error rate (WER). In other implementations, identifying the retraining data includes identifying one or more long-tail search queries submitted by customers of the customer support system. In some other implementations, identifying the retraining data includes identifying one or more conversational user interface (CUI) fallback statements submitted by customers of the customer support system.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale.

DETAILED DESCRIPTION

Implementations of the subject matter described in this disclosure can be used by a customer support system to efficiently generate transcripts of calls or conversations between customers of a company and agents or professionals of the company by learning terminology specific to the subject matter of the calls or conversations and/or by tailoring the generated transcripts for certain levels of customer sophistication. In accordance with various aspects of the present disclosure, automatic speech recognition (ASR) language models can be trained with training data pertaining to certain subject matters of interest to increase the speed and accuracy with which calls or conversations between the customers and the agents can be transcribed. The training data can include internal data sources and external data sources. The internal data sources can be data sources produced by or readily available within the support system and can include user-generated content (e.g., user-generated forums, posts, and the like), conversational user interface (CUI) fallback statements, and other suitable data repositories associated with the company. The external data sources can be data sources external to the support system and can include sources such as governmental or other official sources related to the subject matter of the customer support calls. For example, Internal Revenue Service data, such as one or more publications from the Internal Revenue Service, can be used as an external data source for calls or conversations specific to tax preparation services or tax-related advice. In some implementations, training data that includes external data sources can train the ASR language model to properly transcribe terms of art and other technical terminology specific to the subject matter of the customer call, and training data that includes internal data sources can train the ASR language model to properly transcribe vernacular terms used by specific customers and agents of the customer support system. In this manner, training ASR language models using data specific to the subject matter of a particular call or conversation can improve transcription accuracy, thereby improving customer satisfaction, increasing the efficiency of customer service, and reducing the need for human intervention to correct or clarify transcription errors.

In some implementations, the trained ASR language model can be retrained or tuned, for example, to continue improving transcription accuracy. In some aspects, selection of the retraining data can be at least partially automated, for example, to reduce the need for manual review of transcripts. In addition, or in the alternative, transcripts generated for a given customer call or conversation can be transformed into a question-and-answer (Q&A) format that can be used to answer questions posed during subsequent customer calls or conversations. For example, when a subsequent customer poses questions similar to those posed by the given customer, the Q&A formatted transcript of the given customer's call or conversation can be used to assist answering the subsequent customer's questions, or in some instances can be provided to the subsequent customer. The ability to provide Q&A formatted transcripts of previous customer calls or conversations to a subsequent customer posing similar or related questions cannot only increase the speed with which the subsequent customer's questions are answered but can also reduce, in at least some instances, the need for the subsequent customer to call customer service and consume limited human resources available to the customer service system.

Various implementations of the subject matter disclosed herein provide one or more technical solutions to the technical problem of accurately transcribing spoken conversations in a customer support system, particularly when such conversations involve language or terminology that is specific or unique to a certain subject matter (such as tax-related matters and financial services). More specifically, various aspects of the present disclosure provide a unique computing solution to a unique computing problem that did not exist prior to electronic or online customer support systems that supplement human assistance provided to customers with automated or augmented assistance information, much less transcripts of prior customer calls or conversations with customer service generated by speech recognition systems. Further, by selectively weighting various portions of the training data used to train ASR language models disclosed herein, implementations of the subject matter disclosed herein provide meaningful improvements to the performance and effectiveness of customer support systems. As such, implementations of the subject matter disclosed herein are not an abstract idea such as organizing human activity or a mental process that can be performed in the human mind, for example, because the human mind is not capable of training an ASR language model, much less automatically transcribing conversations using an ASR model trained with weighted training data.

Moreover, various aspects of the present disclosure effect an improvement in the technical field of retraining and retuning ASR models by identifying transcripts and portions of transcripts estimated to have elevated word error rates (WER) or identifying other retraining or tuning data sources. The described methods for retraining and retuning ASR models cannot be performed in the human mind, much less using pen and paper. In addition, implementations of the subject matter disclosed herein do far more than merely create contractual relationships, hedge risks, mitigate settlement risks, and the like, and therefore cannot be considered a fundamental economic practice.

Figure 1:
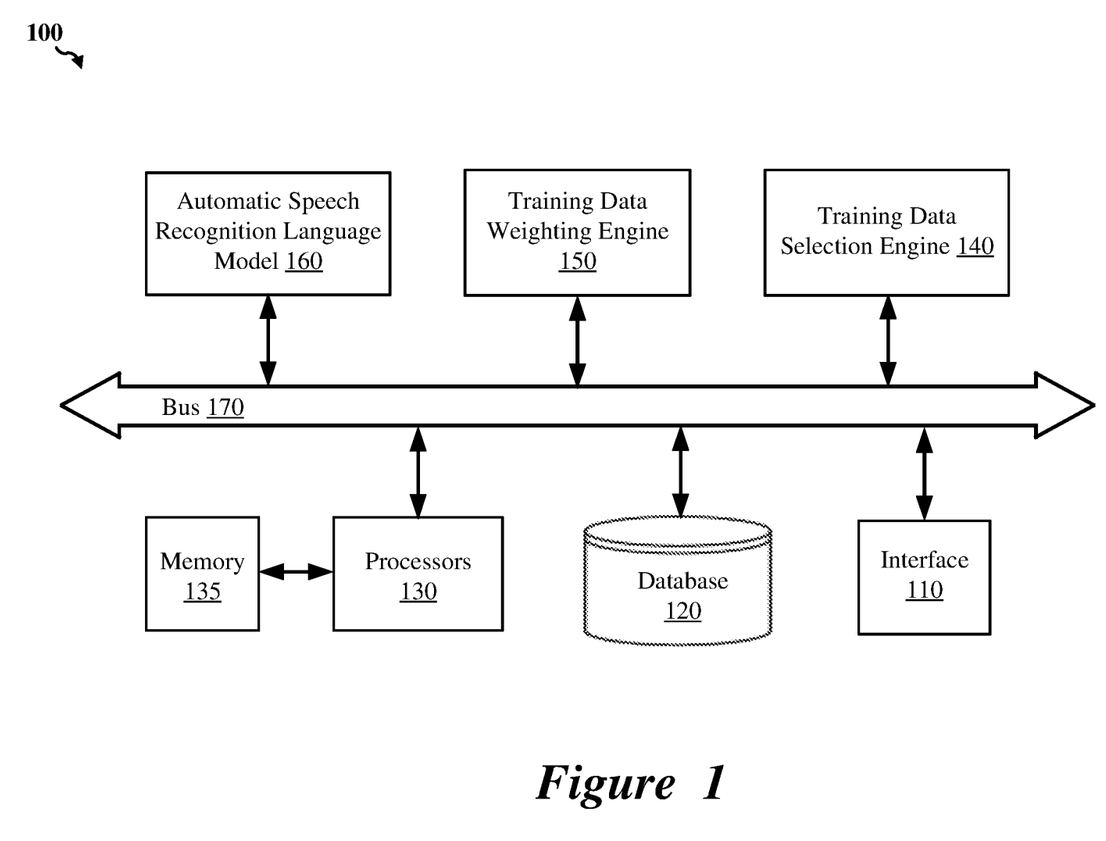
FIG. 1 shows a block diagram of a support call transcription system, according to some implementations.

FIG. 1 shows a support call transcription system 100, according to some implementations. Various aspects of the support call transcription system 100 disclosed herein are applicable for training ASR language models for transcribing calls or conversations between customers and agents of a company (such as may be represented by the support call transcription system 100). For example, the support call transcription system 100 can train an ASR language model to generate transcripts of customer/agent conversations that include words, phrases, acronyms, and other terminology specific to a particular subject matter (such as tax preparation or tax-related advice). In some implementations, transcripts of calls or conversations generated by the support call transcription system 100 can be tailored based on a level of sophistication of the customer. The support call transcription system 100 can also be used to identify or select retraining data that can be used to retrain or tuning the ASR language model, for example, to minimize the word error rate (WER) of the system. Further, the support call transcription system 100 can transform transcripts generated by the trained ASR language model into a question and answer (Q&A) format that can be used to assist subsequent customers having similar or related questions regarding the same subject matter.

The support call transcription system 100 is shown to include an input/output (I/O) interface 110, a database 120, one or more data processors 130, a memory 135 coupled to the one or more data processors 130, a training data selection engine 140, a training data weighting engine 150, and an automatic speech recognition language model 160. In some implementations, the various components of the support call transcription system 100 can be interconnected by at least a data bus 170, as depicted in the example of FIG. 1. In other implementations, the various components of the support call transcription system 100 can be interconnected using other suitable signal routing resources.

The interface 110 can include a screen, an input device, and other suitable elements that allow a user to provide information to the support call transcription system 100 and/or to retrieve information from the support call transcription system 100. Example information that can be provided to the support call transcription system 100 can include one or more sources of training data, retraining and tuning data, and so on. Example information that can be retrieved from the support call transcription system 100 can include one or more support call transcripts, one or more Q&A formatted transcripts, and so on.

The database 120, which represents any suitable number of databases, can store any suitable information pertaining to sources of training data, retraining and tuning data for the support call transcription system 100. The sources of training data can include external data sources and internal data sources. The external data sources can include information such as laws, regulations, guidelines, FAQs, or other assistance data provided by or obtained from an external entity. For example, when the support call transcription system 100 transcribes a call or conversation relating to tax matters, the external data sources can include data from a governmental tax collection entity such as the Internal Revenue Service (IRS). The internal data can include data or information provided by the support call transcription system 100 or a company associated with the support call transcription system 100. Some examples of internal data sources are user generated content (UGC) provided or submitted by other customers, long-tail search queries, and conversational user interface (CUI) fallback utterances submitted or spoken by previous customers. In some implementations, the database 120 can be a relational database capable of presenting the information as data sets to a user in tabular form and capable of manipulating the data sets using relational operators. In some aspects, the database 120 can use Structured Query Language (SQL) for querying and maintaining the database 120.

The data processors 130, which can be used for general data processing operations, can be one or more suitable processors capable of executing scripts or instructions of one or more software programs stored in the support call transcription system 100 (such as within the memory 135). The data processors 130 can be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 can be implemented as a combination of computing devices (such as a combination of a DSP and a microprocessor, a plurality of microprocessors, one or more microprocessors in conjunction with a DSP core, or any other such configuration). In some implementations, the data processors 130 can be remotely located from one or more other components of support call transcription system 100.

The memory 135, which can be any suitable persistent memory (such as non-volatile memory or non-transitory memory) can store any number of software programs, executable instructions, machine code, algorithms, and the like that can be executed by the data processors 130 to perform one or more corresponding operations or functions. In some implementations, hardwired circuitry can be used in place of, or in combination with, software instructions to implement aspects of the disclosure. As such, implementations of the subject matter disclosed herein are not limited to any specific combination of hardware circuitry and/or software.

The training data selection engine 140 can be used to identify and select data sources for training, retraining, or tuning the ASR language model 160. For example, the training data selection engine 140 can select one or more of the data sources from the database 120 discussed above. Further, the training data selection engine 140 can send the selected data sources to the ASR language model 160 for training, retraining, or tuning the ASR language model 160.

The training data weighting engine 150 can determine one or more weighting models for weighting the data sources selected by the training data selection engine 140. For example, the one or more weighting models can be selected to weight portions of the training data originating from external data sources differently than portions of the training data originating from internal data sources. The weighting models can also select different weights for each type of data source, for example, such as UGC data sources, long-tail search queries, CUI fallback utterances, and so on. In some implementations, the weighting models can be selected or configured based on a level of sophistication of the customer. In some instances, the weighting models apply higher weights to external data sources than to internal data sources when the level of sophistication of the customer is relatively high and apply higher weights to the internal data sources than to the external data sources when the level of sophistication of the customer is relatively low.

Customer sophistication may be expressed as the degree to which a customer is able to express and explain their problem using appropriate technical or application-specific terminology. Customer sophistication may in some implementations be quantified based on one or more word frequencies or other language statistics of a transcript.

In some implementations, the weighting models include a high user sophistication weighting model and a low user sophistication weighting model. In some other implementations, additional weighting models can be provided for levels of customer sophistication that fall between the relatively high sophistication level and the relatively low sophistication level. The levels of user sophistication can be based on a degree of familiarity the customer has demonstrated with one or more of terms of art in the subject matter of the customer support system; proper English syntax (as opposed to more vernacular speech patterns); or knowledge of specific products offered by or associated with the provider of the customer support system.

The automatic speech recognition (ASR) language model 160 receives the selected training data from training data selection engine 140, receives the one or more weighting models from the training data weighting engine 150, and trains the ASR language model 160 based on the selected training data and the one or more weighting models. For example, when the customer support system is a tax return preparation customer support system, the selected training data and the one or more weighting models can train the ASR language model 160 to recognize tax return specific terminology including, for example, official technical terminology from the IRS and customer vernacular commonly used by users or customers of the customer support system. The ASR language model 160 can be any suitable ASR language model configured to translate customer support sessions (e.g., conversations) into text transcripts. For example, one ASR language model that can be used with the example implementations is Amazon Transcribe, from Amazon.com, Inc. The ASR language model 160 can also receive the selected data sources for retraining or tuning the ASR language model 160 from the training data selection engine 140 and apply the selected data sources to retrain or tune the ASR language model 160, as discussed further below.

The particular architecture of the support call transcription system 100 shown in FIG. 1 is but one example of a variety of different architectures within which aspects of the present disclosure can be implemented. For example, in other implementations, the support call transcription system 100 may not include a training data selection engine 140, the functions of which can be implemented by the processors 130 executing corresponding instructions or scripts stored in the memory 135. In some other implementations, the functions of the training data weighting engine 150 can be performed by the processors 130 executing corresponding instructions or scripts stored in the memory 135. Similarly, the functions of the ASR language model 160 can be performed by the processors 130 executing corresponding instructions or scripts stored in the memory 135. In some other examples, the support call transcription system 100 can be implemented as software as a service (SaaS), or as managed software as a service (MSaaS). For example, when implemented as SaaS or MSaaS the functions of the support call transcription system 100 can be centrally hosted and can be accessed by users using a thin client, such as a web browser.

Figure 2:
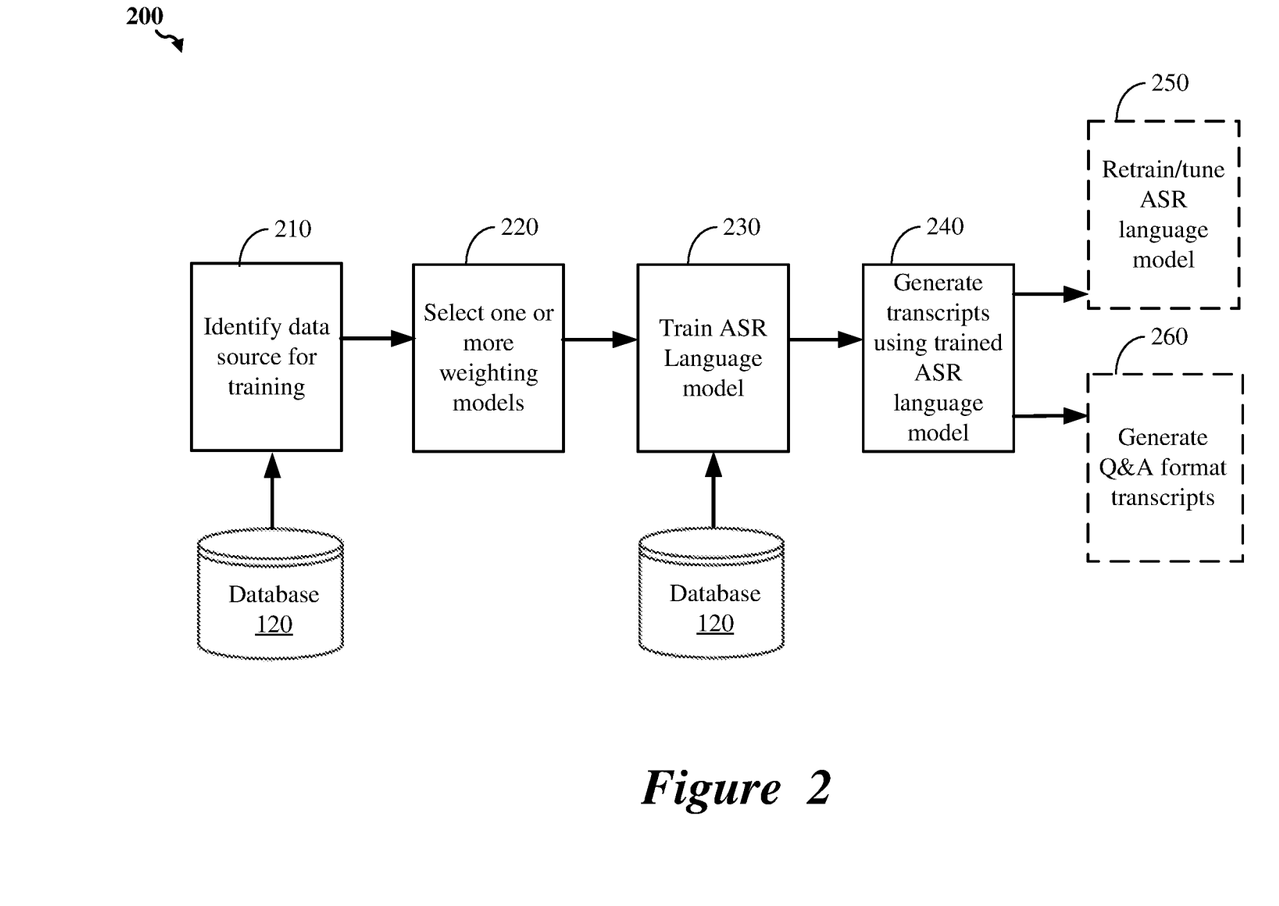
FIG. 2 shows a high-level overview of an example process flow that can be employed by the support call transcription system of FIG. 1.

FIG. 2 shows a high-level overview of an example process flow 200 that can be employed by the support call transcription system 100 of FIG. 1. In block 210, one or more data sources are identified for training the ASR language model 160. For example, the one or more data sources can be identified from the database 120 or from another suitable local source or a remote source accessible via one or more networks. As discussed above, the data sources for training the ASR language model 160 can include one or more external sources and one or more internal sources. At block 220, one or more weighting models are selected for weighting the selected data sources. At block 230, the ASR language model 160 is trained using the identified data sources, for example, as received from the database 120 and optionally weighted by the one or more weighting models. At block 240, the trained ASR language model 160 generates transcripts for one or more support calls between users, customers and agents of the customer support system. Additionally, at block 250, the ASR language model 160 can be retrained or tuned using retraining or tuning data, as further discussed below. In some implementations, at block 260, transcripts generated using the trained ASR language model 160 can be processed in a manner that transforms the transcripts into a Q&A format that can be used to assist other customers who subsequently call customer service, as further discussed below.

As discussed above, while ASR language models can be employed for transcribing ordinary conversations (such as conversations that do not involve terms of art or technical terms specific to tax preparation), generalized ASR language models typically have undesirably high error rates when transcribing subject-matter specific conversations. For example, in a customer support system, support calls between a customer and an agent can include subject-matter specific terminology (such as terms of art, technical terms, and subject-matter specific vernacular) as well as trademarked terms relating to the specific subject matter discussed in the support call. For example, for implementations in which the customer support system provides customer support for a tax return preparation system, the support calls can include tax-related terminology such as terms of art from governmental departments of revenue, vernacular relating to tax return preparation, and names of companies or products associated with the preparation of tax returns. Because generalized ASR language models may not accurately transcribe conversations including such subject-matter specific terminology, it is desirable to select appropriate data sources for training the ASR language model in a specific way that improves the functioning of the support service 100 and increases the accuracy with which customer calls or conversations are transcribed without human involvement or assistance.

Accordingly, the example implementations allow for the selection of appropriate data sources for training an ASR language model based on the specific subject matter or context of customer support calls. For example, such data sources can include external data sources and internal data sources. As described, external data sources may refer to training data obtained from sources other than the provider or the users of the customer support system such as sources of laws or regulations relating to the subject matter of the customer support system. For example, in instances for which the customer support system is a tax return preparation customer support system, these external sources can include data sources from a national, state, or local tax agency (e.g., the Internal Revenue Service (IRS)), and can also include one or more technical dictionaries, standards or specifications relating to the subject-matter of the customer support system. Internal data sources can include one or more sources of training data provided by agents or users of the customer support system. For example, internal data sources can include sources of data generated by a provider of the customer support system (such as answers to frequently asked questions, instructions and so on), can include user-generated content (UGC) provided by users of the customer support system (such as forum posts, questions asked by users, and so on), can include long-tail search queries (such as highly focused but infrequent search queries), and can include conversational user interface (CUI) fallback utterances. UGC data sources can provide a helpful indicator of vernacular language used by customers when discussing certain topics or subject matter. For example, when the customer support system is a tax return customer support system, the UGC can include terms and phrases used by customers when asking tax-related questions or referring to tax-related concepts. As such, vernacular language can be beneficial in training the ASR language model to accurately transcribe customer utterances in the context of tax-related questions or tax-related concepts.

In some implementations, one or more weighting models can be selected to apply different weights to portions of the training data originating from external data sources relative to portions of the training data originating from internal data sources. For example, in some instances, a first weighting model can assign a greater weight to external sources than to internal sources, and a second weighting model can assign a greater weight to internal sources than to external sources. In some aspects, selection of the weighting models can be based at least in part on sophistication levels of the customers. For example, when a customer participating in a customer support call is determined to have a relatively high level of sophistication, the customer may have a greater understanding of technical terms and phrases. As such, transcripts of such a customer's statements or questions are more accurate when generated using an ASR language model trained with greater weights assigned to external sources than to internal sources. Conversely, when a customer is determined to have a relatively low level of sophistication, the customer may use more vernacular language, rather than terminology specific to the particular subject matter. As such, transcripts of calls involving a less sophisticated customer are more accurate when the ASR language model is trained with greater weights assigned to internal sources (which use more vernacular language) than to external sources.

After selecting the data sources and the one or more weighting models, the ASR language model is trained using the selected data sources as weighted by the one or more weighting models. The trained ASR language model is then used to generate transcripts of calls or conversations between customers and agents of the customer support system.

There may be a mismatch between the sophistication level of a customer and the sophistication level of the ASR language model. That is, the weighting model currently used by the ASR language model may correspond to a higher or a lower level of sophistication than is appropriate for a particular customer. In some implementations, such mismatches can be determined by analyzing the customer's word frequencies in real time. For example, while generating a transcript of the current user's support call with an agent, the ASR language model can use a first weighting model which assumes a relatively high level of user sophistication. The support call transcription system 100 can analyze word frequencies of the current user and determine that the user has a relatively low level of sophistication, for example, based on the use of vernacular language rather than technical language or terms of art. Upon detecting this mismatch between the level of user sophistication associated with the first weighting model and the level of sophistication determined from the current user's utterances, the ASR language model can be re-configured to use a second weighting model that more closely corresponds with the user's demonstrated level of sophistication. In some implementations, the transcripts of the support call can be divided, or "chunked," into short segments, such as 1 or 2 minute segments, such that the weighting model employed by the ASR language model can be switched between segments in order to dynamically adapt to the user's level of sophistication.

After training the ASR language model, the ASR language model can be retrained or re-tuned to further improve the accuracy with which customer transcripts are transcribed. For example, transcripts generated using the trained ASR language model may still contain errors. Corrections for common errors can be added to the training data in order to improve transcription accuracy. Because validation of transcripts to identify such errors in conventional ASR systems is largely a manual process, it is desirable to reduce the need for manually identifying portions of the customer transcripts that contain (or are likely to contain) transcription errors. Accordingly, implementations of the subject matter disclosed herein can identify data sources to retrain or re-tune the ASR language model in a manner that is more efficient than manual techniques employed by conventional ASR systems.

In some implementations, customer transcripts can be analyzed to identify portions or sections having a relatively high word error rate (WER) (such as a WER greater than a value). The support system 100 can take advantage of the fact that language patterns, such as high levels of vernacular language, can be correlated with specific topics. In some aspects, the support system 100 can use latent Dirichlet allocation to segment customer transcripts into various portions to more readily identify errors. In addition, or in the alternative, importance sampling can be performed on segmented customer transcripts to determine which transcript segments are most likely to have a relatively high WER (such as may be indicated by language patterns of language types).

A trained predictive model can be used to detect transcripts having a relatively high WER. In some aspects, the predictive model can use logical regression to identify transcripts estimated to be within a group of transcripts having the highest WER. For example, the predictive model can be configured to predict whether or not a given transcript is one of the top 10% of transcripts as a function of WER. The predictive model can be trained using transcripts previously identified as having a relatively high WER and sorted based on various attributes such as, for example, an amount or percentage of vernacular language used in the customer transcript, one or more attributes of a user, for example from user's profile, one or more attributes or measurements relating to user sophistication, a level or indicator of product complexity, one or more word frequencies, and so on.

In some implementations, data sources used to retrain or re-tune the trained ASR language model can be identified by sampling long-tail search queries. For example, a sample set of long-tail search queries in vernacular English can be selected for retraining or tuning the trained ASR language model. Such long-tail search queries can be a valuable source of data for tuning the ASR language model because Applicant has determined that such queries are far more likely to trigger a response from an agent of the customer support system, as compared to other search queries. Thus, the sample set of the long-tail search queries can be helpful for tuning the ASR model, as transcripts generated using the ASR model are likely to include terminology from the search queries that triggered the call or conversation between the customer and the agent.

Data sources used to retrain or re-tune the trained ASR language model can also include CUI fallback utterances. Because CUI fallback utterances can trigger a response from an agent, they are likely to include terminology and phrases spoken during the corresponding call or conversation with customer support. As such, the selection or sampling of CUI fallback utterances can be beneficial for retraining or re-tuning the ASR language model.

An accurately transcribed support call between a customer and an agent of the customer support system can also be used to provide support or assistance to other customers. For example, when a question asked by a customer is answered by an agent during a particular support call, the answer can be stored and subsequently provided to one or more other customers who ask the same or similar question. Thus, in some implementations, the support system 100 can transform transcripts generated for a particular customer call into support documents that can be provided to other customers having similar questions. In some aspects, the support system 100 can transform transcripts of customer calls into a question and answer (Q&A) format by separating a support call transcript into a sequence of utterances by the agent and a sequence of utterances by the customer. Generating support documents in this manner can be particularly helpful to subsequent customers, for example, because vernacular language can be preserved in the documents. That is, the support documents can include questions and answers which are phrased in language commonly used by users of the customer support system. In some implementations, Q&A pairs from transcripts can be added to a queue for review before presented to subsequent customers. For example, Q&A pairs and other information derived from customer transcripts contained in the queue can be reviewed by trusted customers or users of the customer support system.

Figure 3:
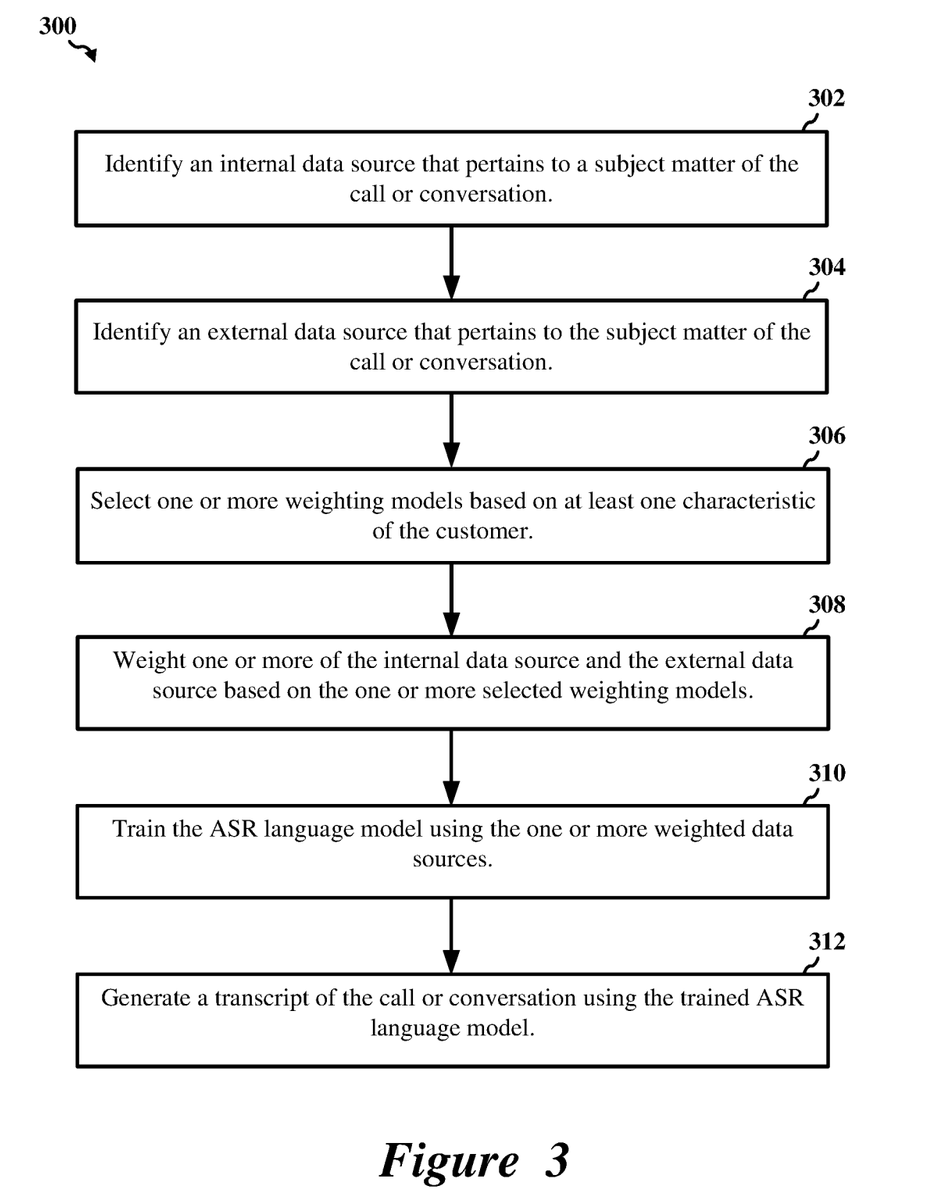
FIG. 3 shows an illustrative flow chart depicting an example operation for providing customized automatic speech recognition (ASR) for a call or conversation between a customer and an agent of a customer support system, according to some implementations.

FIG. 3 shows an illustrative flow chart depicting an example operation 300 for providing customized automatic speech recognition (ASR) for a call or conversation between a customer and an agent of a customer support system, according to some implementations. The example operation 300 can be performed by one or more processors of a system. For example, the system can include or can be associated with the support call transcription system 100 of FIG. 1. It is to be understood that the example operation 300 can be performed by any suitable systems, computers, or servers.

At block 302, the support call transcription system 100 identifies a data source internal to the customer support system that pertains to a subject matter of the call or conversation. At block 304, the support call transcription system 100 identifies a data source external to the customer support system that pertains to the subject matter of the call or conversation. At block 306, the support call transcription system 100 selects one or more weighting models based on at least one characteristic of the customer. At block 308, the support call transcription system 100 weights one or more of the internal data source and the external data source based on the one or more selected weighting models. At block 310, the support call transcription system 100 trains the ASR language model using the one or more weighted data sources. At block 312, the support call transcription system 100 generates a transcript of the call or conversation using the trained ASR language model.

The internal external data sources can be data sources produced by or readily available within the support system, and can include user-generated content (e.g., user-generated forums, posts, and the like), conversational user interface (CUI) fallback statements, and other suitable data repositories associated with the company. The external data sources can be data sources external to the support system and can include sources such as governmental or other official sources related to the subject matter of the customer support calls. For example, Internal Revenue Service data can be used as an external data source for calls or conversations specific to tax preparation services or tax-related advice. In some implementations, training data that includes external data sources can train the ASR language model to properly transcribe terms of art and other technical terminology specific to the subject matter of the customer call, and training data that includes internal data sources can train the ASR language model to properly transcribe vernacular terms used by specific customers and agents of the customer support system. In this manner, training ASR language models using data specific to the subject matter of a particular call or conversation can improve transcription accuracy, thereby improving customer satisfaction, increasing the efficiency of customer service, and reducing the need for human intervention to correct or clarify transcription errors.

In some implementations, transcripts generated for a given customer call or conversation can be transformed into a question-and-answer (Q&A) format that can be used to answer questions posed during subsequent customer calls or conversations. For example, when a subsequent customer poses questions similar to those posed by the given customer, the Q&A formatted transcript of the given customer's call or conversation can be used to assist answering the subsequent customer's questions, or in some instances can be provided to the subsequent customer. The ability to provide Q&A formatted transcripts of previous customer calls or conversations to a subsequent customer posing similar or related questions can increase the speed with which the subsequent customer's questions are answered and can also reduce the need for the subsequent customer to call customer service and consume limited human resources available to the customer service system.

Figure 4A:
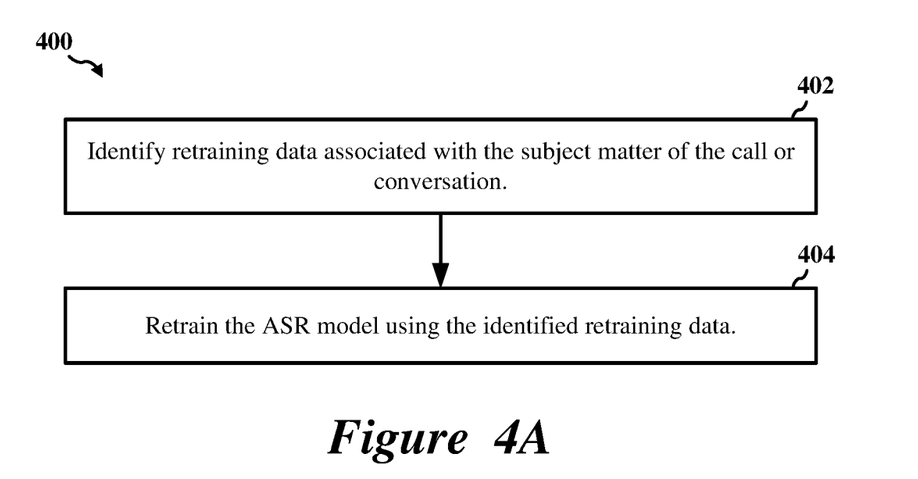
FIG. 4A shows an illustrative flow chart depicting an example operation for retraining an ASR language model, according to some implementations.

FIG. 4A shows an illustrative flow chart depicting an example operation 400 for retraining an ASR language model, according to some implementations. The example operation 400 can be performed by one or more processors of a system. For example, the system can include or can be associated with the support call transcription system 100 of FIG. 1. It is to be understood that the example operation 400 can be performed by any suitable systems, computers, or servers. In some implementations, the operation 400 can be performed after generating the transcript in block 312 of the operation 300 of FIG. 3.

At block 402, the support call transcription system 100 identifies retraining data associated with the subject matter of the call or conversation. At block 404, the support call transcription system 100 retrains the ASR language model using the identified retraining data. In this manner, the ASR language model can be retrained or re-tuned to continue improving transcription accuracy. In some aspects, selection of the retraining data can be at least partially automated, for example, to reduce the need for manual review of transcripts.

Figure 4B:
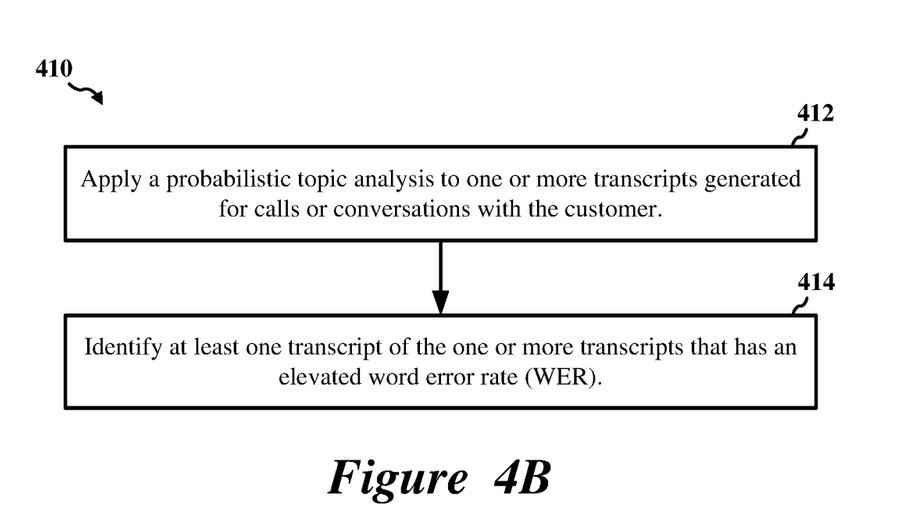
FIG. 4B shows an illustrative flow chart depicting an example operation for identifying retraining data, according to some implementations.

FIG. 4B shows an illustrative flow chart depicting an example operation 410 for identifying retraining data, according to some implementations. The example operation 410 can be performed by one or more processors of a system. For example, the system can include or can be associated with the support call transcription system 100 of FIG. 1. It is to be understood that the example operation 410 can be performed by any suitable systems, computers, or servers. In some implementations, the operation 410 can be one example of identifying the retraining data in block 402 of the operation 400 of FIG. 4A.

At block 412, the support call transcription system 100 applies a probabilistic topic analysis to one or more transcripts generated for calls or conversations with the customer. At block 414, the support call transcription system 100 identifies at least one transcript of the one or more transcripts that has a relatively high word error rate (WER). By analyzing customer transcripts to identify portions or sections having a relatively high WER, the support system 100 can take advantage of the fact that language patterns, such as high levels of vernacular language, can be correlated with specific topics. In some aspects, the support system can use latent Dirichlet allocation to segment customer transcripts into various portions to more readily identify errors. The support system can also perform importance sampling on segmented customer transcripts to determine which transcript segments are most likely to have a relatively high WER (such as may be indicated by language patterns of language types).

Figure 4C:
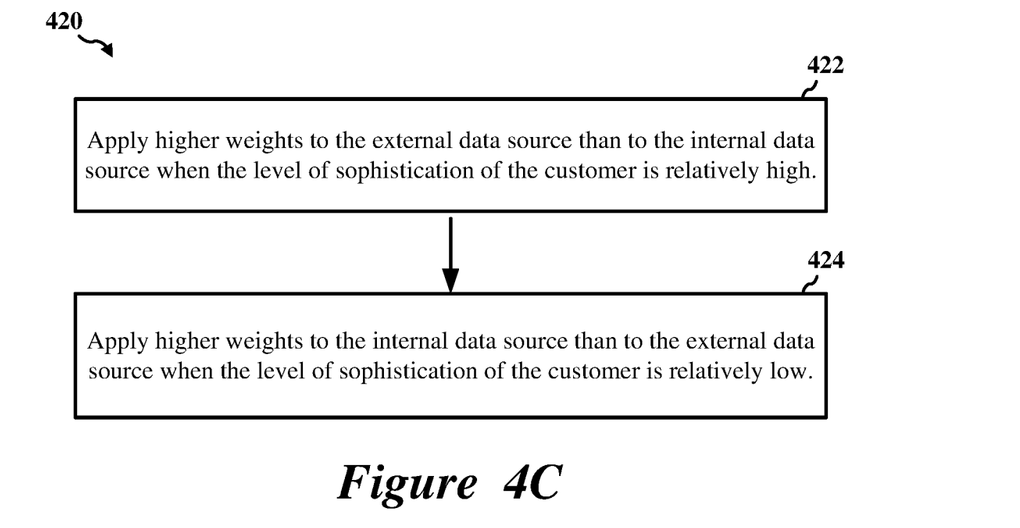
FIG. 4C shows an illustrative flow chart depicting another example operation for identifying retraining data, according to some implementations.

FIG. 4C shows an illustrative flow chart depicting another example operation 420 for identifying retraining data, according to some implementations. The example operation 420 can be performed by one or more processors of a system. For example, the system can include or can be associated with the support call transcription system 100 of FIG. 1. It is to be understood that the example operation 420 can be performed by any suitable systems, computers, or servers. In some implementations, the operation 410 can be one example of identifying the retraining data in block 402 of the operation 400 of FIG. 4A.

At block 422, the support call transcription system 100 applies higher weights to the external data source than to the internal data source when the level of sophistication of the customer is relatively high. At block 424, the support call transcription system 100 applies higher weights to the internal data source than to the external data source when the level of sophistication of the customer is relatively low. In this manner, the support system can select weighting models that weigh portions of the training data originating from external data sources differently than portions of the training data originating from internal data sources.

Figure 5:
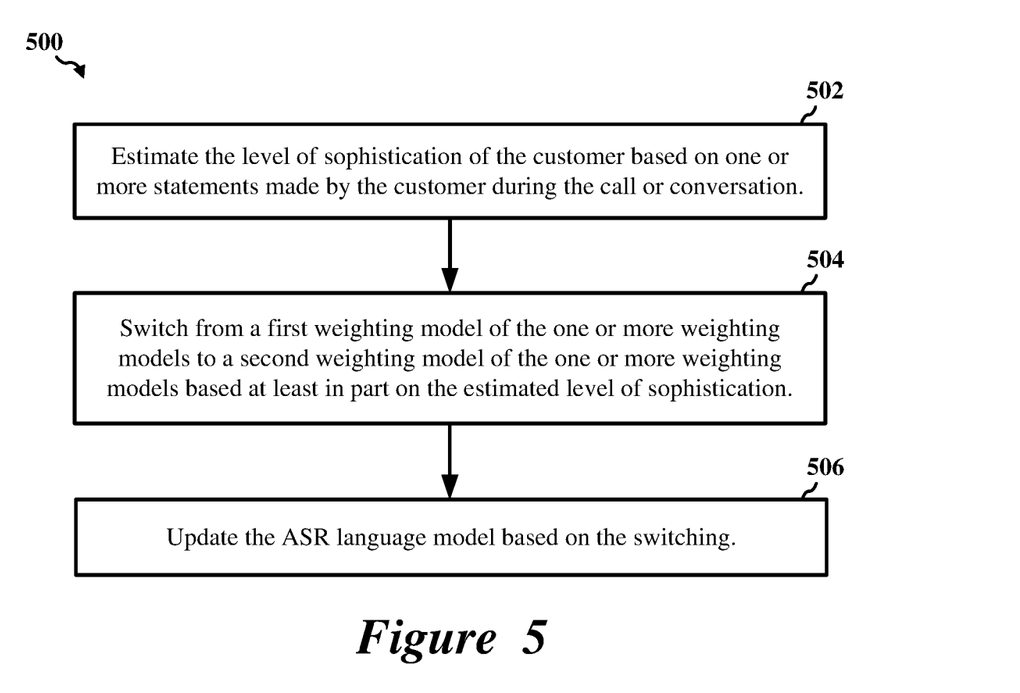
FIG. 5 shows an illustrative flow chart depicting an example operation for providing customized ASR for a call or conversation between a customer and an agent of a customer support system, according to some implementations.

FIG. 5 shows an illustrative flow chart depicting an example operation 500 for providing customized ASR for a call or conversation between a customer and an agent of a customer support system, according to some implementations. The example operation 500 can be performed by one or more processors of a system. For example, the system can include or can be associated with the support call transcription system 100 of FIG. 1. It is to be understood that the example operation 500 can be performed by any suitable systems, computers, or servers. In some implementations, the operation 500 can be performed concurrently with one or more of the processes of the operation 300 of FIG. 3.

At block 502, the support call transcription system 100 estimates the level of sophistication of the customer based on one or more statements made by the customer during the call or conversation. At block 504, the support call transcription system 100 switches from a first weighting model of the one or more weighting models to a second weighting model of the one or more weighting models based at least in part on the estimated level of sophistication. At block 506, the support call transcription system 100 updates the ASR language model based on the switching.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for providing customized automatic speech recognition (ASR) for a call or conversation between a customer and an agent of a customer support system, the method performed by one or more processors of the customer support system and comprising:
   identifying a data source internal to the customer support system that pertains to a subject matter of the call or conversation;
   identifying a data source external to the customer support system that pertains to the subject matter of the call or conversation;
   selecting one or more weighting models based on at least one characteristic of the customer, the at least one characteristic of the customer comprising a level of sophistication of the customer, wherein the one or more weighting models are configured to apply higher weights to the external data source than to the internal data source when the level of sophistication of the customer is relatively high; and the one or more weighting models are configured to apply higher weights to the internal data source than to the external data source when the level of sophistication of the customer is relatively low;
   weighting one or more of the internal data source and the external data source based on the one or more selected weighting models;
   training the ASR language model using the one or more weighted data sources; and
   generating a transcript of the call or conversation using the trained ASR language model.

2. The method of claim 1, wherein the customer support system is a tax-related customer support system, and wherein the external data source is a governmental tax agency.

3. The method of claim 1, further comprising:
   estimating the level of sophistication of the customer based on one or more statements made by the customer during the call or conversation.

4. The method of claim 3, further comprising:
   switching from a first weighting model of the one or more weighting models to a second weighting model of the one or more weighting models based at least in part on the estimated level of sophistication; and
   updating the ASR language model based on the switching.

5. The method of claim 1, wherein the internal data source includes user generated content (UGC) comprising questions or answers submitted by users of the customer support system.

6. The method of claim 1, wherein the internal data source includes conversational user interface (CUI) fallback statements from users of the customer support system.

7. The method of claim 1, further comprising:
   identifying retraining data associated with the subject matter of the call or conversation; and
   retraining the ASR model using the identified retraining data.

8. The method of claim 7, wherein identifying the retraining data comprises:
   applying a probabilistic topic analysis to one or more transcripts generated for calls or conversations with the customer; and
   identifying at least one transcript of the one or more transcripts that has an elevated word error rate (WER).

9. The method of claim 8, wherein identifying the retraining data further comprises applying a trained predictive model to the one or more transcripts.

10. The method of claim 7, wherein identifying the retraining data comprises identifying one or more long-tail search queries submitted by customers of the customer support system.

11. The method of claim 7, wherein identifying the retraining data comprises identifying one or more conversational user interface (CUI) fallback statements submitted by customers of the customer support system.

12. The method of claim 1, further comprising transforming the transcript into a question and answer (Q&A) format.

13. A system for providing customized automatic speech recognition (ASR) in a customer support system, the system comprising:
one or more processors; and
a memory storing instructions that, when executed by the one or more processors, cause the system to perform operations comprising:
identifying a data source internal to the customer support system that pertains to a subject matter of the call or conversation;
identifying a data source external to the customer support system that pertains to the subject matter of the call or conversation;
selecting one or more weighting models based on at least one characteristic of the customer, the at least one characteristic of the customer comprising a level of sophistication of the customer, wherein the one or more weighting models are configured to apply higher weights to the external data source than to the internal data source when the level of sophistication of the customer is relatively high; and the one or more weighting models are configured to apply higher weights to the internal data source than to the external data source when the level of sophistication of the customer is relatively low;
weighting one or more of the internal data source and the external data source based on the one or more selected weighting models;
training the ASR language model using the one or more weighted data sources; and
generating a transcript of the call or conversation using the trained ASR language model.

14. The system of claim 13, wherein execution of the instructions causes the system to perform operations further comprising:
estimating the level of sophistication of the customer based on one or more statements made by the customer during the call or conversation.

15. The system of claim 13, wherein execution of the instructions causes the system to perform operations further comprising:
identifying retraining data associated with the subject matter of the call or conversation; and
retraining the ASR model using the identified retraining data.

16. A method for providing customized automatic speech recognition (ASR) for a call or conversation between a customer and an agent of a customer support system, the method performed by one or more processors of the customer support system and comprising:
identifying a data source internal to the customer support system that pertains to a subject matter of the call or conversation;
identifying a data source external to the customer support system that pertains to the subject matter of the call or conversation;
selecting one or more weighting models based on at least one characteristic of the customer, the at least one characteristic of the customer comprising a level of sophistication of the customer, wherein the one or more weighting models are configured to apply higher weights to the external data source than to the internal data source when the level of sophistication of the customer is relatively high and wherein the one or more weighting models are configured to apply higher weights to the internal data source than to the external data source when the level of sophistication of the customer is relatively low;
weighting one or more of the internal data source and the external data source based on the one or more selected weighting models;
training the ASR language model using the one or more weighted data sources; and
generating a transcript of the call or conversation using the trained ASR language model.

* * * * *